March 10, 1959 R. W. GEORGE 2,876,599

TUNING APPARATUS

Filed March 9, 1956

INVENTOR.
RALPH W. GEORGE
BY
Charles H. Brown
ATTORNEY

United States Patent Office
2,876,599
Patented Mar. 10, 1959

2,876,599

TUNING APPARATUS

Ralph W. George, Princeton, N. J., assignor to Radio Corporation of America, a corporation of Delaware Application March 9, 1956, Serial No. 570,634

9 Claims. (Cl. 51—105)

Figures 1, 2:
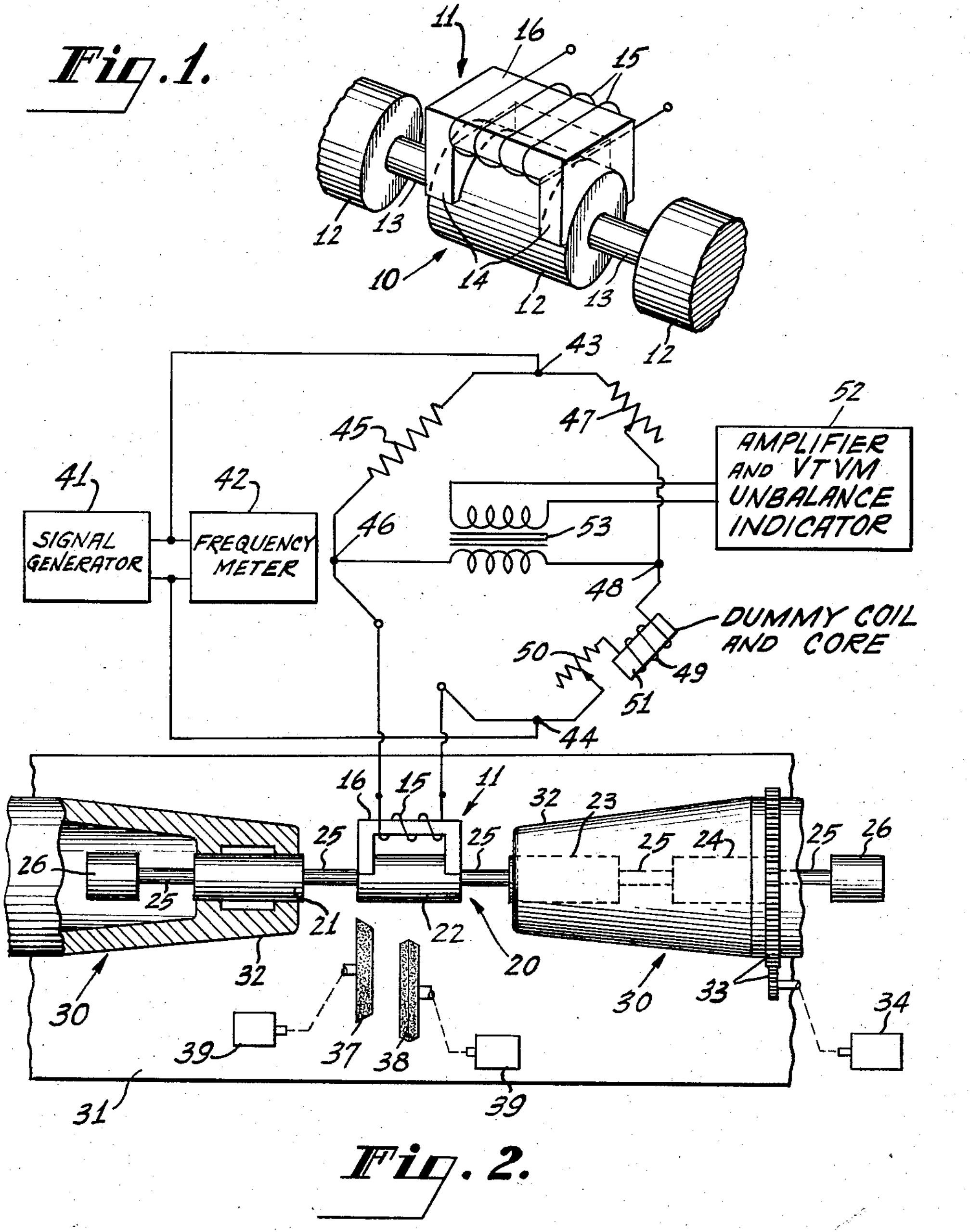

The invention relates to tuning apparatus for magnetostrictive filter elements, and particularly to tuning apparatus for the rapid mass production of magnetostrictive filter elements.

In order to tune mechanical resonators of magnetostrictive filter elements, it has been customary to measure the resonant frequency of each individual mechanical resonator to determine whether its resonant frequency is the value desired. This procedure requires, of course, that the mechanical resonator be magnetostrictive. Generally, this measurement has been made by placing a coil around the resonator whose frequency is to be measured, providing magnetic bias for the resonator, clamping the two adjacent resonators, energizing the coil with an alternating current to produce an axial field in the resonator, and varying the frequency of the alternating current. At its resonant frequency, the resonator absorbs maximum power from the coil, a condition that is indicated by a maximum current flow through the coil. If the resonant frequency of the resonator is within the desired frequency range, no further steps are necessary to tune the resonator. However, if the resonant frequency is not within the desired range, the adjacent resonators must be unclamped, the coil must be removed, a small amount of the resonator material must be ground away to correct the resonant frequency, and then the resonant frequency must be measured again. These steps must be repeated until the resonant frequency is within the desired range. In addition, the steps just outlined must be repeated for each resonator of the filter element. While such an operation is practical, it is not an operation which permits large quantities of filter elements to be manufactured rapidly. Furthermore, it is not an operation which readily permits the resonant frequency of the resonators to be measured easily after a complete magnetostrictive filter has been assembled.

Accordingly, an object of the invention is to provide a device for rapidly measuring the resonant frequency of a magnetostrictive mechanical resonator.

Another object of the invention is to provide a device that permits the resonant frequency of a mechanical resonator to be measured with comparative ease, and permits the resonant frequency of the resonator to be changed quickly and easily to the value desired.

Another object of the invention is to provide a device that facilitates the mass production of mechanical filter elements.

Briefly, these and other objects are accomplished in accordance with the invention by the use of a U-shaped core of magnetic material so dimensioned that its ends are separated sufficiently to set up an exciting field through a node of motion in the mechanical resonator to be tuned. A coil is coupled to the central portion of the U-shaped core, and when the ends of the core are placed on opposite sides of a node of motion in the resonator to be tuned (i. e. bridge the node of motion) and an energizing current is applied to the coil, the resonator will be sufficiently excited to permit its resonant frequency to be measured. The U-shaped core makes it possible to apply or remove the exciting means without first unclamping or clamping the adjacent resonators. Rotatable means may be provided for clamping the adjacent resonators so that the resonator which is being tuned may be more easily ground if it is necessary to change its frequency.

The invention is explained in detail in connection with the accompanying drawing, in which:

Fig. 1 shows a preferred embodiment of the U-shaped core when in position for exciting a resonator; and Fig. 2 shows one arrangement in accordance with the invention for tuning the resonators of mechanical filter.

In Fig. 1, a perspective view of a portion of a mechanical filter 10 which comprises one or more cylindrical resonators 12 made of magnetostrictive material and interconnected along their longitudinal axes by cylindrical couplers 13 is shown. A U-shaped core 11 is shown in position for exciting one of the cylindrical resonators 12. Where the resonators 12 have a larger diameter than the couplers 13, such as shown in Fig. 1, the filter 10 is generally referred to as a neck-coupled filter. Where the couplers have a larger diameter than the resonators, the filter is generally referred to as a slug-coupled filter. In either case, it has been found that a U-shaped core having the appropriate dimensions will provide sufficient excitation to permit the resonant frequency of the resonators to be measured. The U-shaped core 11 is made of a magnetic material having low loss and high permeability, such as ferrite, and its ends 14 are separated sufficiently to set up an exciting field through a node of motion in the resonators 12 which are to be tuned. In Fig. 1, it is assumed for purposes of illustration that the resonators 12 are a half wavelength long at the midband frequency of the filter 10. Hence a node or area of minimum motion occurs midway between the ends of the resonators 12. In such a case, improved excitation fields are obtained by using a U-shaped core whose ends are separated by a distance substantially equal to the length (i. e. a half wavelength) of the resonators to be tuned. Better excitation is also provided if the ends 14 are given a concave circular shape to conform with the surface of the resonator 12. A coil 15 is coupled to the central portion 16 of the U-shaped core 11, and when the coil 15 is energized with an alternating current, an alternating magnetic field is set up between the ends 14 of the core 11. If the ends 14 of the core 11 are brought close to, but not touching, the surface of the resonator 12, so that the ends 14 of the core 11 are on opposite sides of a node of motion in the resonator 12 (or in the example are adjacent respective ends of the resonator 12), the field between the ends 14 of the core 11 will pass axially through the resonator 12. If the resonator 12 is properly biased, it will vibrate mechanically in the same manner as though an exciting coil were surrounding the resonator 12. Suitable magnetic bias can be gotten by placing an external magnet adjacent to the resonator 12 or by biasing the filter 10 with magnetic bias provided by a flow of direct current.

Fig. 2 shows one arrangement using the U-shaped core 11 of Fig. 1 for tuning the resonators of mechanical filters. The mechanical filter 20 shown in Fig. 2 comprises four magnetostrictive cylindrical resonators 21, 22, 23, 24 interconnected along their longitudinal axes by cylindrical coupling necks 25. The outer ends of the two end resonators 21, 24 are connected to mounting slugs 26 by similar cylindrical coupling necks 25. A pair of chucks 30 are mounted in bearings (not shown) on a suitable base plate 31 so that they may rotate freely, and so that their rotational axes coincide. The two chucks 30 are hollow along their rotational axes so that the filter element 20 can be moved longitudinally through them. The chucks 30 are provided with suitable means (not shown) for opening and closing their jaws 32. Each of the jaws 32 is preferably shaped and dimensioned so that the adjacent resonators to be clamped are firmly held at both ends around their circumferential surface when the jaws 32 are closed. The jaws 32 are also dimensioned so that they can firmly clamp the mounting slugs 26 around the circumferential surface of one end. As shown in Figure 2, the two chucks 30 are separated by a distance substantially the same as the distance between the inner ends of the resonators 21, 23 which are adjacent to the particular resonator 22 being tuned. One or both of the chucks 30 is provided with suitable rotating means, such as the gears 33 and motor 34 shown. The chucks 30 and their bearings should have a mass large enough to prevent the adjacent resonators 21, 23 from vibrating when they are clamped in the jaws 32. The U-shaped core 11 is preferably mounted on a movable bracket (not shown) or some similar device on the base plate 31 to permit the core 11 to be moved and to vary the amount of exciting field coupled to the resonator being tuned. Grinding wheels 37, 38 rotated by motors 39 or other suitable means are also mounted on the base plate 31 so that they may be moved against or backed away from the resonator 21 to be tuned.

External magnetic biasing means (not shown) may be provided for suitably biasing the resonator 22 to be tuned. However, if the filter 20 is biased with residual circular magnetic bias, this residual circular bias may be unduly reduced if the resonator 22 to be tuned must be ground. This bias may be restored or maintained by passing a direct current longitudinally through the filter 20 while it is held in position by the jaws 32 of the chucks 30. If this is required, it is necessary that one of the chucks 30 be electrically insulated from the other chuck 30.

Energizing and frequency indicating means for the tuning apparatus comprise a suitable alternating current signal generator 41 and frequency meter 42. The signal generator 41 should be capable of generating alternating currents over a range which includes the resonant frequency of the resonator to be tuned. The output of the signal generator 41 is applied to the frequency meter 42. It is also applied to a pair of input terminals 43, 44 of a Wheatstone bridge which serves to indicate the resonant frequency of the resonator being tuned. The bridge comprises a fixed resistor 45 connected between the first input terminal 43 and a first output terminal 46 and a variable resistor 47 connected between the first input terminal 43 and a second output terminal 48. The energizing coil 15 is connected between the first output terminal 46 and the second input terminal 44, and a dummy coil 49 and a variable resistor 50 are serially connected between the second output terminal 48 and the second input terminal 44. The dummy coil 49 is wound about a core 51 so as to simulate the impedance presented by the energizing coil 15 coupled to its U-shaped core 11 when the core 11 is adjacent a resonator to be tuned. A suitable indicating device, such as an amplifier and vacuum tube voltmeter 52, is coupled to the output terminals 46, 48 of the Wheatstone bridge through a transformer 53.

The following procedure will illustrate the relative ease and rapidity with which all the resonators 21, 22, 23, 24 of the mechanical filter 20 may be tuned. With the jaws 32 of the chucks 30 open, the mechanical filter 20 is passed through the chucks 30 until the particular resonator 22 to be tuned is opposite the U-shaped core 11, and the adjacent resonators 21, 23 are symmetrically positioned in their respective chucks 30. The jaws 32 are then closed so that the adjacent resonators 21, 23 are firmly clamped. The U-shaped core 11 and its coil 15 are then moved into a position adjacent to the particular resonator 22 to be tuned so that the ends 14 of the U-shaped core 11 are close to, but not touching, the respective ends of the resonator 22. The U-shaped core 11 is then clamped in this position. Alternating current frequencies from the signal generator 41 are then applied to the input terminals 43, 44 of the Wheatstone bridge. The frequency is varied in the direction of the resonant frequency of the resonator being tuned. As this resonant frequency is approached, the resonator absorbs more and more power. This condition is indicated by a change in deflection on the vacuum tube voltmeter 52. With the frequency set at one side of the resonant frequency, the variable resistor 47, the resistor 50 connected in series with the dummy coil 49, and the coupling between the dummy coil 49 and its core 51 are then varied to bring the Wheatstone bridge into balance. The frequency is then varied again toward the resonant frequency until the resonant frequency is indicated by a maximum deflection of the vacuum tube voltmeter 52. This frequency is measured by the frequency meter 42, and if this frequency is within the desired range, then another resonator is tuned. If the resonant frequency is to be corrected, the filter 20 is rotated by applying the driving means 34 to the chuck 30. As the filter 20 is rotating, one of the grinding wheels 37, 38, while also rotating, is brought to bear against the end or the central portion of the resonator 22 so as to grind a small amount of material from the resonator 22. For the neck coupled filter shown in Figure 2, the material is ground from the end of the resonator 22 by the grinding wheel 37 if the frequency is to be increased. The material is ground from the central portion by the grinding wheel 38 if the frequency is to be decreased. The grinding wheel is then moved back and the chuck rotating means 33, 34 are stopped. The resonant frequency of the resonator is then measured again. These steps of measuring and grinding are continued until the resonator 22 is tuned to the desired frequency. Then the jaws 32 of the chucks 30 are opened, and the filter element 20 is moved in a longitudinal direction so that another resonator is positioned between the two chucks 30 and adjacent to the U-shaped core 11. The jaws 32 are closed, and this resonator is then tuned in the manner previously described. All the resonators are tuned in the same way.

Persons skilled in the art will appreciate the ease and rapidity with which resonators can be tuned by using the U-shaped core. Furthermore, the U-shaped core enables the resonators of an assembled mechanical filter to be tuned since it is not necessary to position an exciting coil around the resonators. It will also be apparent to persons skilled in the art that the U-shaped core can be used with similar advantage where the resonators of slug-coupled filter elements must be tuned. Finally, the U-shaped core makes it feasible to use any degree of automation in the tuning process, thus enabling large quantities of filter elements to be produced rapidly and cheaply.

The invention claimed is:

1. Tuning apparatus for a filter having a mechanical resonator made of magnetostrictive material, comprising means for firmly clamping said filter on both adjacent sides of said resonator to prevent said adjacent sides from vibrating, a U-shaped core of magnetic material, said core being dimensioned so that its ends are separated sufficiently to set up an exciting field through a node of motion in said resonator to be tuned, means for positioning said core so that its ends bridge a node of motion in said resonator to be tuned, and a coil coupled to the central portion of said core for applying an energizing current thereto and mechanically exciting said resonator to be tuned.

2. Tuning apparatus for a magnetostrictive filter comprising a plurality of alternate resonators and couplers interconnected end-to-end, comprising means for firmly clamping the resonators adjacent the resonator to be tuned to prevent said adjacent resonators from vibrating, a U-shaped core of magnetic material, said core being dimensioned so that its ends are separated sufficiently to set up an exciting field through a node of motion in said resonator to be tuned, means for positioning said core so that its ends bridge a node of motion in said resonator to be tuned, and a coil coupled to the central portion of said core for applying an energizing current thereto and mechanically exciting said resonator to be tuned.

3. Tuning apparatus for magnetostrictive filter elements comprising a plurality of alternate resonators and couplers interconnected end-to-end in a line, comprising a base plate, means mounted on said base plate for firmly clamping the resonators adjacent the resonator to be tuned to prevent said adjacent resonators from vibrating, a U-shaped core of magnetic material, said core being dimensioned so that its ends are separated sufficiently to set up an exciting field through a node of motion in said resonator to be tuned, means for movably mounting said core on said base plate so that the ends of said core may be positioned on opposite sides of a node of motion in said resonator to be tuned, and a coil coupled to the central portion of said core for applying an energizing current thereto and mechanically exciting said resonator to be tuned.

4. Tuning apparatus for magnetostrictive filter elements comprising a plurality of cylindrical resonators and couplers alternately interconnected end-to-end so that their longitudinal axes lie in a straight line, comprising a base plate, a pair of rotatable chucks mounted on said base plate so that their axes of rotation coincide for firmly clamping the resonators adjacent the resonator to be tuned to prevent said adjacent resonators from vibrating, a U-shaped core of magnetic material, said core being dimensioned so that its ends are separated sufficiently to set up an exciting field through a node of motion in said resonator to be tuned, means for positioning said core with its ends on opposite sides of a node of motion in said resonator to be tuned, and a coil coupled to the central portion of said core for applying an energizing current thereto and mechanically exciting said resonator to be tuned.

5. Tuning apparatus for magnetostrictive filter elements comprising a plurality of cylindrical resonators and couplers alternately interconnected end-to-end so that their longitudinal axes lie in a straight line, comprising a base plate, a pair of rotatable chucks mounted on said base plate with their axes of rotation coincident for firmly clamping the resonators adjacent the resonator to be tuned to prevent said adjacent resonators from vibrating, a U-shaped core of magnetic material, said core being dimensioned so that its ends are separated sufficiently to set up an exciting field through a node of motion in said resonator to be tuned, means for movably mounting said core on said base plate so that the ends of said core may be positioned on opposite sides of a node of motion in said resonator to be tuned, and a coil coupled to the central portion of said core for applying an energizing current thereto for mechanically exciting said resonator to be tuned.

6. Tuning apparatus for magnetostrictive filter elements comprising a plurality of cylindrical resonators and couplers alternately interconnected end-to-end so that their longitudinal axes lie in a straight line, comprising a base plate, a pair of rotatable chucks mounted on said base plate with their axes of rotation coincident for firmly clamping the resonators adjacent the resonator to be tuned to prevent said adjacent resonators from vibrating, a U-shaped core of magnetic material, said core being dimensioned so that its ends are separated sufficiently to set up an exciting field through a node of motion in said resonator to be tuned, means for movably mounting said core on said base plate so that the ends of said core bridge a node of motion in said resonator to be tuned, a coil coupled to the central portion of said core, means coupled to said coil for applying an alternating energizing current thereto for mechanically exciting said resonator to be tuned, and means coupled to said coil for indicating resonance.

7. Tuning apparatus for magnetostrictive filter elements comprising a plurality of cylindrical resonators and couplers alternately interconnected end-to-end so that their longitudinal axes lie in a straight line, comprising a base plate, a pair of rotatable chucks mounted on said base plate with their axes of rotation coincident for firmly clamping the resonators adjacent the resonator to be tuned to prevent said adjacent resonators from vibrating, means for rotating said chucks, a U-shaped core of magnetic material, said core being dimensioned so that its ends are separated sufficiently to set up an exciting field through a node of motion in said resonator to be tuned, means for movably mounting said core on said base plate so that the ends of said core may be positioned on opposite sides of a node of motion in said resonator to be tuned, a coil coupled to the central portion of said core, means coupled to said coil for applying an alternating energizing current thereto for mechanically exciting said resonator to be tuned, means coupled to said coil for indicating a resonant frequency of said resonator to be tuned, a grinding device, and means for movably mounting said grinding device on said base plate so that said grinding device may be brought to bear against said resonator to be tuned.

8. Tuning apparatus for magnetostrictive filter elements comprising a plurality of cylindrical resonators and couplers alternately interconnected end-to-end so that their longitudinal axes lie in a straight line, comprising a base plate, a pair of rotatable chucks mounted on said base plate with their axes of rotation coincident for firmly clamping the resonators adjacent the resonator to be tuned to prevent said adjacent resonators from vibrating, means for rotating said chucks, a U-shaped core of magnetic material, said core being dimensioned so that its ends are separated sufficiently to set up an exciting field through a node of motion in said resonator to be tuned, said ends having a concave surface that substantially conforms with the cylindrical surface of said resonator to be tuned, means for magnetically biasing said resonator to be tuned, means for movably mounting said core on said base plate so that the ends of said core may be positioned on opposite sides of a node of motion in said resonator to be tuned, a coil coupled to the central portion of said core, means coupled to said coil for applying an alternating energizing current thereto for mechanically exciting said resonator to be tuned, means coupled to said coil for indicating a resonant frequency of said resonator to be tuned, a grinding device, and means for movably mounting said grinding device on said base plate so that said grinding device may be brought to bear against said resonator to be tuned.

9. Tuning apparatus in accordance with claim 8, wherein the free ends of the legs of said U-shaped core are arcuate in shape.

References Cited in the file of this patent

UNITED STATES PATENTS

| | | |
|---|---|---|
| 1,893,074 | Drake | Jan. 3, 1933 |
| 1,962,438 | Flanzer et al. | June 12, 1934 |
| 2,061,692 | Bagley | Nov. 24, 1936 |
| 2,159,106 | Richter | May 23, 1939 |
| 2,531,414 | Engvall | Nov. 28, 1950 |

OTHER REFERENCES

Roberts, abstract of application Serial No. 29,630 published Sept. 6, 1949, 626 O. G. 285.